(12) United States Patent
Yamamoto et al.

(10) Patent No.: US 10,302,081 B2
(45) Date of Patent: May 28, 2019

(54) ELECTRIC PUMP

(71) Applicant: Aisin Seiki Kabushiki Kaisha, Kariya-shi (JP)

(72) Inventors: Takeru Yamamoto, Tokai (JP); Yoshiaki Ushita, Kariya (JP); Takashi Matsumoto, Toyota (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 199 days.

(21) Appl. No.: 15/263,698

(22) Filed: Sep. 13, 2016

(65) Prior Publication Data

US 2017/0082104 A1 Mar. 23, 2017

(30) Foreign Application Priority Data

Sep. 18, 2015 (JP) .................................. 2015-185358

(51) Int. Cl.
*F04C 2/10* (2006.01)
*F04C 14/08* (2006.01)
(Continued)

(52) U.S. Cl.
CPC .............. *F04C 14/08* (2013.01); *F04C 2/102* (2013.01); *F04C 15/008* (2013.01);
(Continued)

(58) Field of Classification Search
CPC ........ F04C 14/08; F04C 15/008; F04C 2/102; F04C 2270/025; F04C 2240/81;
(Continued)

(56) References Cited

U.S. PATENT DOCUMENTS

| 2008/0007919 | A1* | 1/2008 | Isomoto | ................ | H02M 7/003 |
| | | | | | 361/709 |
| 2010/0243765 | A1* | 9/2010 | Uegaki | ................... | B05B 5/053 |
| | | | | | 239/690 |
| 2017/0009771 | A1* | 1/2017 | Reul | ................... | F04D 13/0606 |

FOREIGN PATENT DOCUMENTS

| JP | 2001-221486 A | 8/2001 |
| JP | 2006-161851 | 6/2006 |

(Continued)

OTHER PUBLICATIONS

Japanese Office Action issued in Japanese Patent Application No. 2015-185358 dated Dec. 4, 2018, citing documents AO and AP therein (w/ English Translation).

*Primary Examiner* — Devon C Kramer
*Assistant Examiner* — David N Brandt
(74) *Attorney, Agent, or Firm* — Oblon, McClelland, Maier & Neustadt, L.L.P.

(57) ABSTRACT

An electric pump includes a motor portion having a rotary drive force by a power supply, a pump portion being operated by the motor portion, and a control portion controlling an electric power being supplied to the motor portion. The motor portion, the pump portion, and the control portion are integrally formed. The control portion includes a control circuit board controlling the electric power supplied to the motor portion, the control portion including a case containing the control circuit board, the control portion including a temperature sensor being provided at a board surface of the control circuit board, the board surface being disposed at a position facing an inner surface of an area of the case, the area being exposed to external air.

4 Claims, 3 Drawing Sheets

(51) Int. Cl.
  *F04C 15/00* (2006.01)
  *F16H 57/04* (2010.01)
(52) U.S. Cl.
  CPC ...... *F04C 2240/40* (2013.01); *F04C 2240/81* (2013.01); *F04C 2270/025* (2013.01); *F16H 57/0436* (2013.01)
(58) Field of Classification Search
  CPC .............. F04C 2240/40; F04C 2270/00; F04C 2270/19; F04C 2270/22; F04C 2270/86; F04C 15/0096; F04C 29/04; F04C 29/047; F16H 57/0436; F04D 15/0209; F04D 27/001; F04D 27/006; F04D 27/0276; F04D 29/58; F04D 29/584; F04D 29/588; F04D 29/5893
  See application file for complete search history.

(56) References Cited

FOREIGN PATENT DOCUMENTS

| | | | |
|---|---|---|---|
| JP | 2014-125955 A | 7/2014 | |
| JP | 2014-181780 | 9/2014 | |
| WO | WO2015/078541 A1 * | 6/2015 | ............. F04D 13/06 |

* cited by examiner

ELECTRIC PUMP

CROSS REFERENCE TO RELATED APPLICATIONS

This application is based on and claims priority under 35 U.S.C. § 119 to Japanese Patent Application 2015-185358, filed on Sep. 18, 2015, the entire content of which is incorporated herein by reference.

TECHNICAL FIELD

This disclosure generally relates to an electric pump.

BACKGROUND DISCUSSION

A known electric pump is disclosed in JP2014-181780A (hereinafter referred to as Patent reference 1). Patent reference 1 discloses a technology that operates an electric oil pump under conditions where an oil temperature level detected by an oil temperature sensor is equal to or higher than a predetermined temperature level. The electric pump disclosed in Patent reference 1 directly detects the temperature level of oil by including the oil temperature sensor within an oil pan of an engine.

A vehicle including an engine is widely used, the vehicle being provided with an oil pump that supplies oil (lubricant) of an oil pan of the engine to an oil pressure actuator or to a main gallery of the engine.

The temperature level of oil reserved in the oil pan of the engine may be low, and the viscosity of the oil may be high. The oil may not be supplied appropriately even if the oil pump operates to rotate with a normal rotary speed because of the low temperature level of the oil. From this reason, according to Patent reference 1, the operation mode of the oil pump is set in response to the oil temperature level detected by the oil temperature sensor.

Here, regarding to the detection mode of the oil temperature level detected by the oil temperature sensor, for example, the assembling and wiring of the oil temperature sensor take a certain amount of time and effort in a case where the oil temperature sensor that comes in contact with the oil reserved in the oil pan is used. In addition, in a case where the oil temperature sensor coming in contact with the oil is used, the oil temperature level of the oil pan is precisely detected, whereas the oil temperature level of an inside of the oil pump cannot be detected.

That is, in a case where the temperature level of the oil pump is low, the temperature level of the oil supplied to the oil pump may decrease within the oil pump and the viscosity of oil may increase even after the temperature level of the oil increases in response to the operation of the engine. From this reason, the detection of the temperature level of the inside of the oil pump is important. After the oil pump starts operating, the oil temperature level of the inside of the oil pump is desired to be detected precisely by a removal of the influence of the heat generated in response to the operation of the pump.

A need thus exists for an electric pump which is not susceptible to the drawback mentioned above.

SUMMARY

According to an aspect of this disclosure, an electric pump includes a motor portion having a rotary drive force by a power supply, a pump portion being operated by the motor portion, and a control portion controlling an electric power being supplied to the motor portion. The motor portion, the pump portion, and the control portion are integrally formed. The control portion includes a control circuit board controlling the electric power supplied to the motor portion, the control portion including a case containing the control circuit board, the control portion including a temperature sensor being provided at a board surface of the control circuit board, the board surface being disposed at a position facing an inner surface of an area of the case, the area being exposed to external air.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
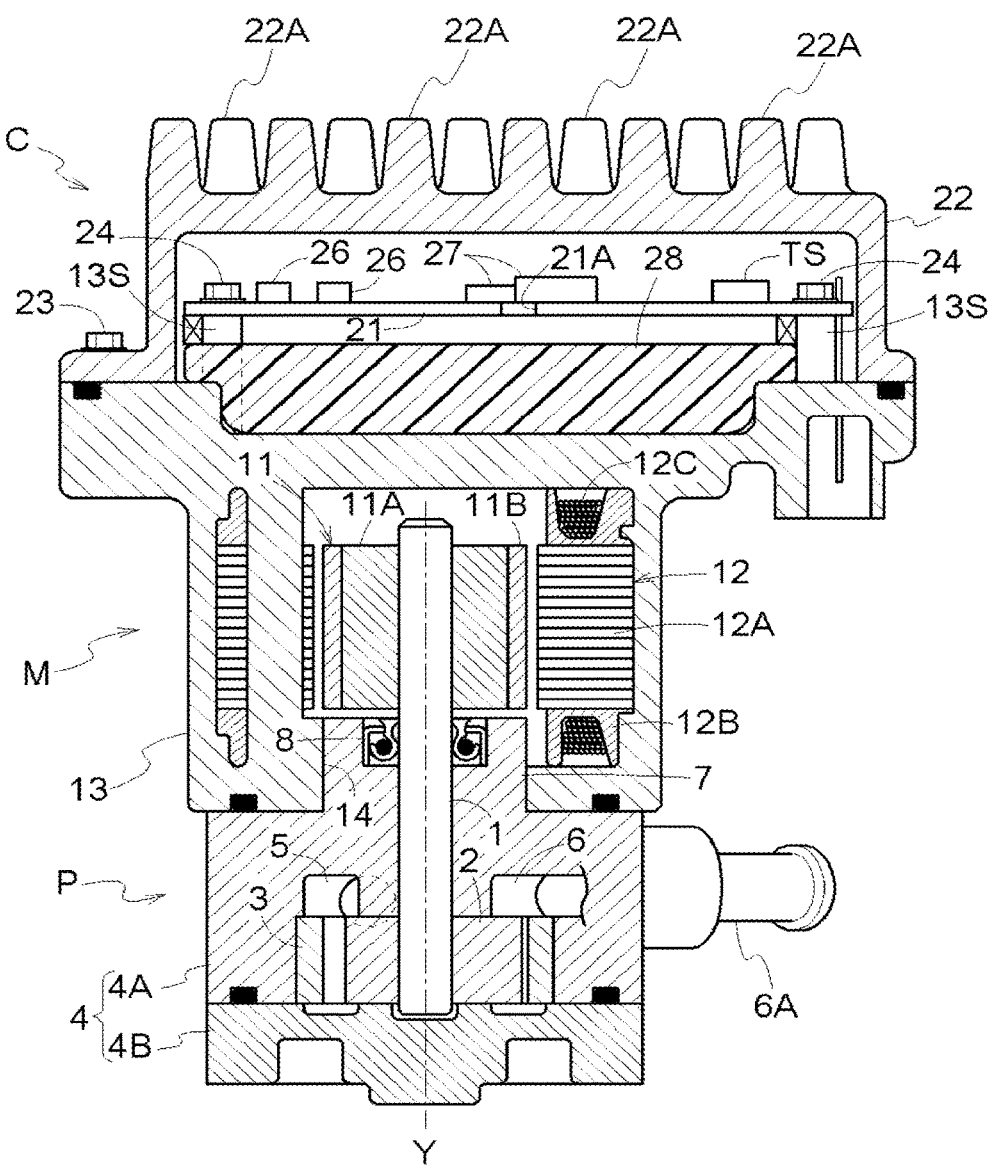
FIG. 1 is a cross sectional view of an electric pump according to a first embodiment disclosed here.

Hereinafter, embodiments of this disclosure will be explained with reference to the drawings. As shown in FIG. 1, an electric pump includes a pump portion P, a motor portion M, and a control portion C that are integrally connected with one another. The pump portion P intakes and discharges oil serving as an example of fluid. The motor portion M drives the pump portion P electrically. The control portion C controls the motor portion M.

The electric pump includes a pump housing 4 of the pump portion P, a motor housing 13 of the motor portion M, and a case 22 of the control portion C that are stacked with one another in the aforementioned order in a direction along a drive axis Y of a motor rotor 11, and that are connectively fixed with one another.

The electric pump serves as an electric pump that is provided at the engine as an oil pump for a transmission system (for example, an automatic transmission system, or an AT or a continuously variable transmission system, or a CVT) of a vehicle. The electric pump may be used to supply fluid in addition to oil.

The pump portion P integrally rotates with a shaft 1 by being fitted onto the shaft 1. The pump portion P includes a pump unit being provided with an inner rotor 2 and an outer rotor 3. The inner rotor 2 includes an outer teeth portion at an outer circumference of the inner rotor 2. The outer rotor 3 includes an inner teeth portion at an inner circumference of the outer rotor 3, the inner teeth portion that is meshed with the outer teeth portion of the inner rotor 2. The pump unit is contained in a rotor chamber of a metal-made pump housing 4, made of, for example, aluminum alloy.

The pump unit serves as a trochoidal-type pump unit. The inner rotor 2 is coaxially and rotatably supported with the drive axis Y of the shaft 1. The outer rotor 3 is supported at supported a position where the outer rotor 3 is displaced by a predetermined amount from the drive axis Y so as to rotate about a free-rotating axis that postures in parallel with the drive axis Y. Alternatively, the pump unit does not have to be the trochoidal-type pump unit and may serve as a gear pump, or a centrifugal pump type including a vane.

The pump housing 4 includes a rotor chamber containing the inner rotor 2 and the outer rotor 3 by the stack of a main housing 4A and a plate-shaped sub housing 4B in a direction along the drive axis Y and by the connection of the main housing 4A and the sub housing 4B with each other by, for example, a bolt. The main housing 4A includes an intake port 5 and a discharge port 6. The main housing 4A includes a protrusion 7 being coaxial with the drive axis Y and protruding in a direction to the motor portion M. FIG. 1 illustrates a discharge tube 6A discharging oil discharged from the discharge port 6. The pump housing 4 is made of a metal material, for example, an aluminum alloy. Alternatively, the pump housing 4 may be made of resin.

The protrusion 7 includes a cylindrical outer circumferential surface about the drive axis Y and a through hole portion in which the shaft 1 is coaxially positioned with the drive axis Y. The through hole portion includes an oil seal 8 that is in contact with the outer circumference of the shaft 1.

The motor portion M serves as a sensorless brushless direct current motor, or a sensorless brushless DC motor that contains, the cylindrical motor rotor 11 being connected to the shaft 1, and the stator 12 being disposed at a position surrounding the motor rotor 11, to a metal-made motor housing 13, for example, aluminum alloy.

The motor rotor 11 is formed in a cylindrical shape by including plural permanent magnets 11B at an outer circumference of a cylindrical back yoke 11A that is connected to the shaft 1. The stator 12 includes a core 12A, an insulator 12B, and a coil 12C. The core 12A is formed such that plural magnetic steel plates are stacked with one another. The insulator 12B is made of electric insulating resin. The coil 12C is made from an electric conductive body, for example, a copper wire, the electric conductive body including an insulating film.

The core 12A is integrally formed with plural teeth portions protruding in the direction to the drive axis Y (inner side) from a ring-shaped yoke portion. The insulator 12B is fitted onto an area where the plural teeth portions are provided from the yoke portion. The insulator 12B includes a portion being fitted onto the teeth portions, the portion being wound with the coil 12C.

The motor housing 13 includes an end portion that is disposed close to the pump portion. The end portion of the motor housing 13 includes a fitting surface 14 that serves as a cylindrical inner surface of about the drive axis Y. The inner diameter of the fitting surface 14 matches the outer shape of the protrusion 7 of the pump housing 4. In a state where the electric pump is assembled, the protrusion 7 is tightly fitted to the fitting surface 14. Accordingly, the positional relationship between the pump housing 4 and the motor housing 113 is established, and the accuracy of the axis of the shaft 1 may be enhanced. The motor housing 13 is made from a metal material, for example, aluminum alloy. Alternatively, the motor housing 13 may be made of resin.

The control portion C includes a control circuit board 21 and the case 22. The control circuit board 21 is supported on a surface of the control portion C opposite to a portion where the pump portion P of the pump housing 4 is disposed. The case 22 is disposed to cover the control circuit board 21.

The case 22 is made of aluminum alloy and includes an inner space at an inner side of the case 22, the inner space being formed in a recess to contain the control circuit board 21. Plural fins 22A are protrudingly provided at an outer surface of the case 22 to radiate heat. Because the case 22 is connected to the motor housing 13 with a connection bolt 23, the inner space where the control circuit board 21 is contained is tightly sealed.

The control circuit board 21 is fixed to a support portion 13S that is integrally formed with the motor housing 13 with a fixing bolt 24. Accordingly, a clearance is formed between the control circuit board 21 and the motor housing 13. A heat insulation material 28 (i.e., serving as a heat insulation portion) serving as a thermal insulation portion is disposed at the clearance.

The control circuit board 21 includes a known structure that is formed with a wire being made of metallic foil by a print wiring technology relative to a plate member that has insulating properties. A board surface is provided with an electric power control circuit, a detection circuit, and a rotary control circuit. The electric power control circuit is made from a field effect transistor, or a FET that controls electric power supplied to the coil 12C of the motor portion M. The detection circuit detects a rotary angle of a rotor in response to a back electromotive force generated at the coil 12C. The rotary control circuit controls electric power control elements 26 by a predetermined cycle in response to detection results of the detection circuit.

Figure 2:
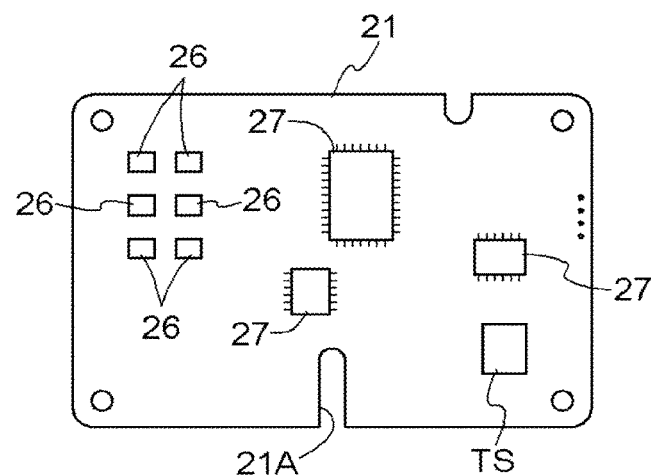
FIG. 2 is a plan view of a control circuit board.

As shown in FIG. 2, the control circuit board 21 includes the plural electric power control elements 26 each serving as the FET including an electric power control circuit at a first end portion of the control circuit board 21 when viewed in a direction orthogonal to the base board surface. The control circuit board 21 includes a control unit 27, for example, a Central Processing Unit, or a CPU, a Digital Signal Processor, or a DSP, and an Application Specific Integrated Circuit, or an ASIC that are disposed at a center position relative to the electric power control element 26, and a logic circuit, the CPU, the DSP, and the ASIC that serve as a detection circuit or a rotary control circuit.

A temperature sensor TS serving as a thermistor is provided at a second end portion of the control circuit board 21. A cutout portion 21A in which a part of a side rim of the control circuit board 21 is cut out is provided at an intermediate position of the control circuit board 21 between the electric power control element 26 and the temperature sensor TS.

The control circuit board 21 is configured such that the electric power control element 26 and the temperature sensor TS are largely separated from each other as a construction of a heat conduction resistance portion for reducing a heat conducted from the electric power control element 26 to the temperature sensor TS. The cutout portion 21A serving as the heat conduction resistance portion inhibits heat from being conducted between the electric power control element 26 and the temperature sensor TS.

Accordingly, the heat conduction resistance portion of the control circuit board 21 inhibits the heat generated at the electric power control element 26 from being conducted. In addition, the heat generated at the coil 12C of the motor portion M is blocked by the heat insulation material 28. As a result, the influence of heat at the temperature sensor TS is reduced and the accuracy of the detected temperature is enhanced even in a case where the electric power is supplied to the motor portion M.

The heat insulation material 28 corresponds to a foamed resin material, for example, a urethane foam. Alternatively, the heat insulation material 28 may be made of glass wool or a cork.

The control circuit board 21 controls the motor portion M in response to control signals sent from an engine control portion, for example, an Engine Control Unit, or an ECU that manages the operation of the engine. Specifically, the control circuit board 21 outputs detected results of the temperature sensor TS to the engine control portion.

Accordingly, the control circuit board 21 rotates the motor rotor 11 and the shaft 1 by a targeted rotary speed by controlling the electric power supplied to the coil 12C of the motor portion M in response to the control signals sent from the engine control portion. The control circuit board 21 rotates the inner rotor 2 and the outer rotor 3 to intake oil from the intake port 5 and to discharge oil from the discharge port 6.

According to the first embodiment, following effects and advantages may be attained. As disclosed in Patent reference 1, the control unit controls the oil pump discharging oil reserved in the oil pan of the engine of the vehicle to be in response to the temperature of oil in a case where the temperature level of oil is below a preset value when the engine starts. The reason of this control is for dealing with a phenomenon in which the lower the temperature level of oil is, the higher the viscosity of oil comes to be. Accordingly, the appropriate control mode of the motor M is set so as to reduce the rotary speed in response to the viscosity of oil, for example.

If the electric oil pump is configured such that the temperature sensor TS is disposed at a position where the temperature sensor TS comes in contact with oil, for example, at an inside of the oil pan, the assembling and wiring of the temperature sensor TS may take a certain amount of time and effort even though the temperature of oil may be detected appropriately. Moreover, as described above, if the electric oil pump is configured such that the temperature sensor TS is disposed at the inside of the oil pan, the temperature sensor TS cannot precisely detect the temperature of the inside of the pump portion P after the motor portion M starts operation. To solve the problem, as described before, the temperature sensor TS is provided at the control circuit board 21.

That is, the control circuit board 21 of the first embodiment includes the temperature sensor TS at an inner portion of the case 22. Accordingly, in a case where the temperature level of the case 22 is equal to, or substantially equal to outside temperature, heat may be radiated between the inner portion of the case 22 and the temperature sensor TS, or the temperature of the temperature sensor TS may match the outside temperature by a convection phenomenon of air inside the case 22. As a result, in a case where the engine is stopped and the temperature level of the electric pump is equal to, or substantially equal to the environmental temperature, the temperature of oil of the transmission system comes to be equal to, or substantially equal to the temperature level of the temperature sensor TS in a state where the electric pump has the temperature level that is equal to the environmental temperature. Accordingly, the oil temperature level of the transmission system may be detected by the temperature sensor TS.

Accordingly, when the engine starts, the engine control portion appropriately controls the temperature level, as an oil temperature level, detected by the temperature sensor TS being provided at the control circuit board 21. Specifically, in a case where the temperature detected by the temperature sensor TS is below the preset value, the engine control portion may control the motor portion M to operate in response to the detected temperature. The temperature sensor TS does not have to be disposed at a position that comes in contact with oil.

Next, even after the motor portion M starts operating, the engine control portion operates the motor portion M continuously, for example, to reduce the rotary speed of the motor portion M in a case where the viscosity of oil increases. Specifically, even in a case where the temperature level of oil increases higher than the predetermined value by the heat of the engine, oil is cooled and the viscosity of oil increases at the pump portion P in a case where the temperature level of the pump portion P is low. Accordingly, the temperature of the pump portion P is desired to be detected precisely by the temperature sensor TS as a control information for operating the motor portion M continuously.

According to the aforementioned first embodiment, because the respective temperature levels of the pump portion P, the motor portion M, and the control portion C of the electric pump are maintained equal to, or substantially equal to one another by the heat conduction, the temperature detected by the temperature sensor TS corresponds to the temperature of the pump portion P. The electric pump includes the heat insulation material 28 being provided between the control circuit board 21 and the motor housing 13. The control circuit board 21 is provided with the heat conduction resistance portion. Accordingly, even in a case where the motor portion M starts operating, the temperature sensor TS detects the temperature of the pump portion P precisely while inhibiting the influence of heat generated in response to the operation of the motor portion M. Accordingly, the control portion C controls the pump portion P in response to the viscosity of oil.

Figure 3:
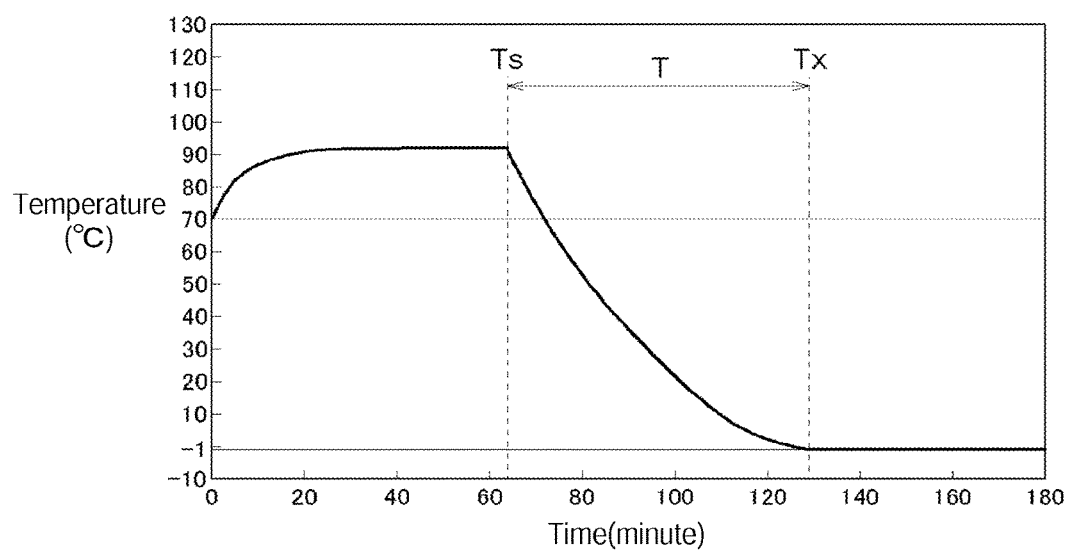
FIG. 3 is a graph illustrating a temperature change of the electric pump.

FIG. 3 illustrates a measurement result of the temperature change of the electric pump in a state where the engine is stopped after the motor M operates under the condition where the temperature level of the electric pump corresponds to 70 degrees Celsius, or 70° C. The measurement is achieved by including sensors at portions of the electric pump. Because the tendency of the temperature change measured by the plural sensors is substantially constant, the measurement result is shown in a single graph.

In a case where the motor portion M starts operating at a timing of zero in a lateral axis, the temperature level of the whole electric pump slightly increases. In a case where the motor portion M stops operating along with the engine at a timing Ts, the temperature of the electric pump decreases by the heat radiation. Then, the temperature of the whole electric pump counterbalances with the environmental temperature at the timing of Tx, and comes to be equal to, or substantially equal to the environmental temperature. In FIG. 3, the environmental temperature corresponds to minus 1° C. Elapsed time T from the timing of Ts to the timing of Tx corresponds to approximately sixty minutes, or 60 minutes.

Figure 4:
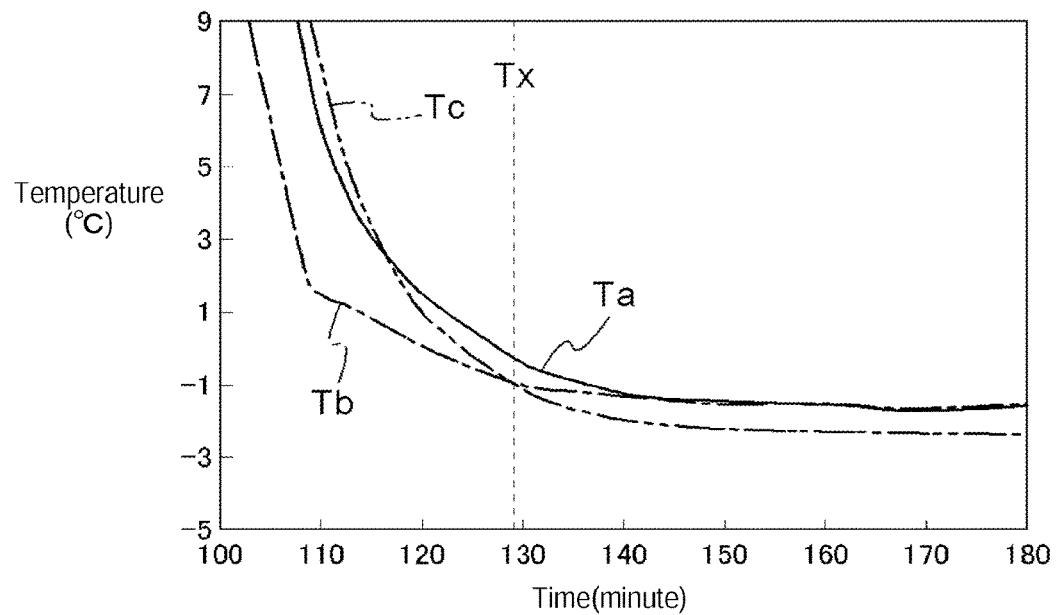
FIG. 4 is a graph illustrating the temperature changes at plural portions of the electric pump.

In FIG. 4, the temperature of a portion of the control circuit board 21, the portion disposed at a position of the temperature sensor TS at the timing of Tx, is illustrated as Ta. The temperature of the surroundings of the case 22 is illustrated as Tb. The temperature of the intake port 5 is illustrated as Tc. In a case where the engine stops, the respective temperatures of Ta, Tb, Tc may decrease in a slightly different manner among one another. However, the respective temperatures of the control circuit board 21, of the surroundings of the case 22, and of the intake port 5 at the timing TX may substantially equally decrease to the environmental temperatures, the timing TX in which the elapsed time corresponds to 60 minutes, after the stop of the motor portion M.

In a case where the engine starts after being stopped, and in a case where it takes equal to or longer than 60 minutes since the previous stop, the detection results of the temperature sensor TS provided at the control circuit board 21 may be regarded as the temperature of oil, leading to the simplification of the control.

The electric pump may be configured as follows other than the aforementioned first embodiment. For convenience of description, the same components as those described in the first embodiment are marked with the same reference numerals.

According to the first embodiment, the heat insulation material 28 is disposed between the control circuit board 21 and the motor housing 13. Alternatively, a heat insulation material may not be provided between the control circuit board 21 and the motor housing 13, and an air space between the control circuit board 21 and the motor housing 13 may serve as a heat insulation portion. Accordingly, the electric pump may prevent heat that acts from the motor housing 13 to the temperature sensor TS from generating even with a simple configuration.

Figure 5:
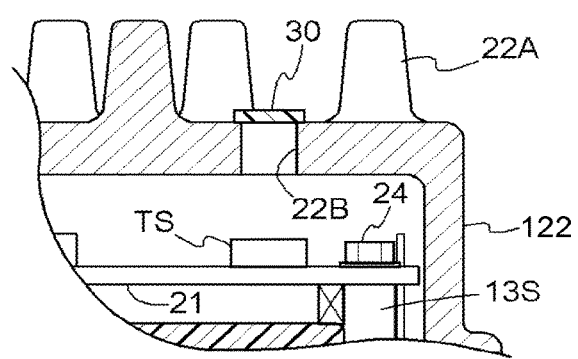
FIG. 5 is a cross sectional view illustrating a structure of a case according to a second embodiment.

As shown in FIG. 5, according to a second embodiment, a hole portion 22B of a case 122 of the control portion C is provided at a position close to the temperature sensor TS and supplies external air to the temperature sensor. According to the second embodiment, a resin material 30 is provided at a position where an outer portion of the hole portion 22B is covered in order to inhibit water drops and dust from entering into the inside of the case 122 via the hole portion 22B, the resin material including air permeability while blocking humidity and dust. Accordingly, the temperature sensor TS measures the environmental temperature precisely by the contact of air of the outside of the case 122 and the temperature sensor TS.

In the first embodiment, the case 22 includes the recessed inner space. Alternatively, for example, a case may have a sealing structure so as to contain the control circuit board 21 in the inside of the case. The case having the sealing structure may be connected to the pump housing 4 to serve as the control portion C. Still, the temperature of fluid of the pump portion P may be detected by the temperature sensor TS provided at the control circuit board 21.

An electric pump may contain the motor rotor 11 of the motor portion M, the inner rotor 2 and the outer rotor 3 of the pump portion P in a single housing. Accordingly, the heat conduction conducted between the pump portion P and the motor portion M may be favorably operated.

This disclosure may be applied to an electric pump that is controllable in response to the temperature of fluid detected by a temperature sensor.

According to the aforementioned embodiments, the electric pump includes the motor portion M having a rotary drive force by a power supply, the pump portion P being operated by the motor portion M, and the control portion C controlling an electric power being supplied to the motor portion M. The motor portion M, the pump portion P, and the control portion C are integrally formed. The control portion C includes a control circuit board 21 controlling the electric power supplied to the motor portion M, the control portion C including a case 22, 122 containing the control circuit board 21, the control portion C including the temperature sensor TS being provided at a board surface of the control circuit board 21, the board surface being disposed at a position facing an inner surface of an area of the case, the area being exposed to external air.

In a case where the outside temperature rarely changes, because the respective temperature levels of the motor portion M, of the pump portion P, of the case 22, 122 of the control portion C, and of the control circuit board 21 contained in the case 22, 122 are balanced with the environmental temperature, the temperature of the control circuit board 21 comes to be equal to, or substantially equal to the temperature of the case 22, 122 containing the control circuit board 21. For example, in a case where the electric pump is provided at the engine of the vehicle as an oil pump, the temperature detected by the temperature sensor TS is equal to, or substantially equal to the temperature of oil of the oil pan because the temperature of oil of the oil pan and the temperature of the control circuit board 21 are equal to, or substantially equal to each other in a state where the engine is stopped and the respective temperatures of the motor portion M, of the pump portion P and of the control portion C are equal to, or substantially equal to the environmental temperature. Accordingly, as a temperature sensor for detecting the temperature of fluid supplied to the pump portion P, the electric pump detects the temperature level of fluid discharged by the pump portion P without the contact of the electric pump to the fluid. Specifically, in a case where the electric pump serves as an oil pump supplying oil of the engine, the electric pump may detect the temperature of oil when the engine starts, and may detect the temperature of the pump portion P even after the engine starts.

According to the aforementioned embodiments, the control portion C is disposed at a position being adjacent to the motor portion M. The control circuit board 21 is provided with the electric power control element 26, the electric power control element 26 controlling the electric power supplied to the motor portion M, the control circuit board 21 including the heat conduction resistance portion (the cutout portion 21A) being disposed between the temperature sensor TS and the electric power control element 26.

According to the aforementioned construction, because the temperature sensor is disposed on the control circuit board 21, the heat is inhibited from being conducted, the heat generated when the motor portion M operates, and the heat generated at the electric power control element 26 provided at the control circuit board 21 is hardly conducted to the temperature sensor TS by the heat conduction resistance portion (the cutout portion 21A). Accordingly, the temperature sensor TS may detect the temperature of fluid precisely at the pump portion P in a case where the motor portion M operates.

According to the aforementioned embodiments, the heat conduction resistance portion (the cutout portion 21A) serves as a cutout portion 21A in which a part of the control circuit board 21, the part being disposed at an intermediate position between the electric power control element 26 and the temperature sensor TS, is removed.

According to the aforementioned construction, the heat generated at the electric power control element 26 in response to the operation of the motor portion M is conducted to the temperature sensor TS via the control circuit board 21. However, because the cutout portion 21A inhibits heat from being conducted, the detection accuracy of the temperature sensor TS may be highly maintained.

According to the aforementioned embodiments, the pump portion P, the motor portion M, and the control portion C are disposed in an aforementioned order in a direction along the drive axis Y of the motor rotor 11 of the motor portion M. The electric pump includes the heat insulation portion (the heat insulation material 28) being disposed between the control circuit board 21 and the motor portion M.

According to the aforementioned construction, because the heat insulation portion blocks heat generated at the motor portion M when the motor portion M operates, the phenomenon in which heat is conducted to the control circuit board 21 may be inhibited, and the detection accuracy of the temperature sensor TS is enhanced.

According to the aforementioned embodiment, the case 122 includes the hole portion 22B supplying external air to the temperature sensor TS.

According to the aforementioned construction, the external air of the outside of the case 122 comes in contact with the temperature sensor TS via the hole portion 22B. Accordingly, the temperature of the temperature sensor TS comes to be equal to, or substantially equal to the outside temperature. Thus, the detection accuracy of the temperature sensor TS may be enhanced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An electric pump, comprising:
a motor portion including a motor rotor that rotates by a rotary drive force;
a pump portion being operated by the motor rotor of the motor portion;
a control portion controlling an electric power being supplied to the motor portion;
a pump housing of the pump portion;
a motor housing of the motor portion; and
a case of the control portion, wherein
the pump portion, the motor portion, and the control portion are integrally connected with one another,
the pump housing, the motor housing, and the case are stacked with one another in the aforementioned order in a direction along a drive axis of the motor rotor, and are connectively fixed with one another,
the control portion includes a control circuit board controlling the electric power supplied to the motor portion,
the control circuit board is supported on a surface of the control portion opposite to a portion where the pump portion of the pump housing is disposed,
the case is disposed to cover the control circuit board,
the control portion includes an electric power control element and a temperature sensor being provided at the same board surface of the control circuit board, the board surface being disposed at a position facing an inner surface of an area of the case, the area being exposed to external air,
the control portion is disposed at a position being adjacent to the motor portion,
the electric power control element controlling the electric power supplied to the motor portion, the control circuit board including a heat conduction resistance portion being disposed between the temperature sensor and the electric power control element, and
the heat conduction resistance portion serves as a cutout portion in which a part of the control circuit board, the part being disposed at an intermediate position between the electric power control element and the temperature sensor, is removed.

2. The electric pump according to claim 1, wherein
the pump portion, the motor portion, and the control portion are disposed in an aforementioned order in a direction along a drive axis of a motor rotor of the motor portion; and
the electric pump includes a heat insulation portion being disposed between the control circuit board and the motor portion.

3. The electric pump according to claim 1, wherein the case includes a hole portion supplying external air to the temperature sensor.

4. The electric pump according to claim 1, wherein
the electric power control element is provided at a first end portion of the control circuit board when viewed in a direction orthogonal to the board surface, and
the temperature sensor is provided at a second end portion of the control circuit board.

* * * * *